US012784641B2

(12) United States Patent
Lu et al.

(10) Patent No.: US 12,784,641 B2
(45) Date of Patent: Nov. 3, 2026

(54) LED DRIVE CIRCUIT, DATA PROCESSING METHOD AND APPARATUS, AND STORAGE MEDIUM

(71) Applicant: LEYARD OPTOELECTRONIC CO., LTD., Beijing (CN)

(72) Inventors: Changjun Lu, Beijing (CN); Zhiyong Liu, Beijing (CN); Baifeng Du, Beijing (CN); Yingchen Hou, Beijing (CN)

(73) Assignee: LEYARD OPTOELECTRONIC CO., LTD., Beijing (CN)

( * ) Notice: Subject to any disclaimer, the term of this patent is extended or adjusted under 35 U.S.C. 154(b) by 0 days.

(21) Appl. No.: 19/177,420

(22) Filed: Apr. 11, 2025

(65) Prior Publication Data

US 2026/0155082 A1 Jun. 4, 2026

(30) Foreign Application Priority Data

Apr. 15, 2024 (CN) ........................ 202410450765.9

(51) Int. Cl.
*G09G 3/20* (2006.01)
*G09G 3/32* (2016.01)

(52) U.S. Cl.
CPC ............. *G09G 3/2092* (2013.01); *G09G 3/32* (2013.01); *G09G 2300/0842* (2013.01); *G09G 2330/12* (2013.01)

(58) Field of Classification Search
CPC .................. G09G 3/2092; G09G 3/32; G09G 2300/0842; G09G 2330/12
See application file for complete search history.

(56) References Cited

U.S. PATENT DOCUMENTS 10,643,559 B2 * 5/2020 Wang .................. G09G 3/3648
2007/0081117 A1 * 4/2007 Liu ...................... G09G 3/3685 349/150
2007/0268204 A1 11/2007 Kawabe
2008/0036957 A1 * 2/2008 Hsu ........................ G09G 3/20 349/151
2009/0024867 A1 * 1/2009 Gloege ............... G06F 11/2007 710/1

(Continued)

FOREIGN PATENT DOCUMENTS

CN 112397012 A 2/2021
WO 2024045760 A1 3/2024

OTHER PUBLICATIONS

The first office action of counterpart EP application No. 251705125 issued on Jun. 5, 2025.

*Primary Examiner* — Ariel A Balaoing
(74) *Attorney, Agent, or Firm* — The Sun IP Law

(57) ABSTRACT

Disclosed are an LED drive circuit, a data processing method and apparatus, and a storage medium. The LED drive circuit comprises a plurality of LED driver chips and a controller, wherein the plurality of LED driver chips respectively comprise a plurality of data input pins and a plurality of data output pins; the controller is connected to the plurality of LED driver chips and configured to send a plurality of paths of display data to the plurality of LED driver chips. The present disclosure solves the technical problem in the related art that the data backup of the whole video card is affected when a certain chip in the video card fails due to the fact that the video card is used as a minimum unit during data backup.

11 Claims, 4 Drawing Sheets

(56) References Cited

U.S. PATENT DOCUMENTS

| | | | | |
|---|---|---|---|---|
| 2015/0310800 | A1* | 10/2015 | Lu | G09G 3/3275<br>345/82 |
| 2020/0111422 | A1* | 4/2020 | Park | G09G 3/2092 |
| 2021/0366369 | A1* | 11/2021 | Wei | G01K 1/026 |
| 2022/0020310 | A1* | 1/2022 | Gray | G09G 3/32 |
| 2023/0237977 | A1 | 7/2023 | Kumamoto | |

* cited by examiner

LED DRIVE CIRCUIT, DATA PROCESSING METHOD AND APPARATUS, AND STORAGE MEDIUM

TECHNICAL FIELD

The present disclosure relates to the technical field of LED display, and in particular, to an LED drive circuit, a data processing method and apparatus, and a storage medium.

BACKGROUND

With the increasing popularization of LED display screens, the application fields of the LED display screens are expanding, and in particular, in scenarios such as conferences and performances, the stability requirements of users on the LED display screens become higher and higher. The stability of the control links and data links are crucial.

In the related art, in order to ensure the stable operation of an LED display screen, a common means is to back up a video displayed by the LED display screen. Existing video backup solutions typically only achieve video card-level backup, and if a certain chip within a video card fails, the backup of the entire video card will be affected.

In view of the above problems, no effective solution has been proposed.

SUMMARY

Embodiments of the present disclosure provide an LED drive circuit, a data processing method and apparatus, and a storage medium, so as to at least solve the technical problem in the related art that the data backup of the whole video card is affected when a certain chip in the video card fails due to the fact that the video card is used as a minimum unit during data backup.

According to one aspect of the embodiments of the present disclosure, provided is an LED drive circuit, comprising a plurality of LED driver chips and a controller, wherein the plurality of LED driver chips respectively include a plurality of data input pins and a plurality of data output pins; wherein the plurality of data input pins of any one of LED driver chip are correspondingly connected to the plurality of data output pins of an adjacent driver chip of the any one of the LED driver chip, so that the plurality of LED driver chips are connected in series by means of a plurality of data links, and the plurality of data links are mutually independent; the controller is connected to the plurality of LED driver chips and configured to send the plurality of paths of display data to the plurality of LED driver chips, the plurality of paths of display data are backup path of data for each other, chip-level data backup is formed, and the plurality of paths of display data are respectively transmitted in the plurality of data links.

As at least one alternative embodiment, the transmission directions of the plurality of paths of display data are the same; a plurality of data output pins of the controller are correspondingly connected to a plurality of input pins of one target driver chip; and a plurality of data output pins of the controller respectively output the plurality of paths of display data, the target driver chip is a driver chip among the plurality of LED driver chips that has only one adjacent chip, and the controller is connected in series with the plurality of LED driver chips.

As at least one alternative embodiment, the transmission directions of the plurality of paths of display data are opposite; there are a plurality of controllers; there are a plurality of target driver chips, a plurality of data output pins of each of the plurality of controllers are respectively correspondingly connected to a plurality of input pins of a corresponding target driver chip; and the plurality of data output pins of each of the plurality of controllers respectively output the plurality of paths of display data, the plurality of target driver chips are driver chips among the plurality of LED driver chips that have only one adjacent chip, and the plurality of controllers are connected in series with the plurality of LED driver chips.

As at least one alternative embodiment, the plurality of paths of display data are two paths of display data.

As at least one alternative embodiment, each of the plurality of LED driver chips includes a detection unit, a memory and a constant current control unit, wherein the detection unit is configured to detect the plurality of paths of display data received by a current driver chip, obtain a plurality of detection results, transmit data to be displayed among the plurality of paths of display data to the memory according to the plurality of detection results, and transmit the remaining data to the next driver chip, wherein the plurality of detection results respectively represent whether errors occur in the plurality of data links for transmitting the plurality of paths of display data, the data to be displayed is data required by the current driver chip, and the remaining data is data other than the data to be displayed among the data received by the current driver chip; the memory is configured to store the data to be displayed; and the constant current control unit is configured to read, from the memory, the data to be displayed, and control an operation state of an LED lamp bead according to the data to be displayed.

As at least one alternative embodiment, each of the plurality of LED driver chips further includes a register, wherein the register is configured to store an error signal generated by the detection unit, and the detection unit generates an error signal when the detection result indicates that an error occurs in a data link for transmitting data.

According to another aspect of the embodiments of the present disclosure, further provided is a data processing method, which is applied to any one of the foregoing LED drive circuits. The method includes: respectively detecting the plurality of paths of display data received by a current driver chip, so as to obtain a plurality of detection results, wherein the plurality of detection results respectively represent whether errors occur in the plurality of data links for transmitting the plurality of paths of display data; according to the plurality of detection results, storing data to be displayed from the plurality of paths of display data, and sending the remaining data to the next driver chip, wherein the data to be displayed is data required by the current driver chip, and the remaining data is data other than the data to be displayed among the data received by the current driver chip; and controlling an operation state of an LED lamp bead according to the data to be displayed.

As at least one alternative embodiment, according to the plurality of detection results, storing data to be displayed from the plurality of paths of display data, and sending the remaining data to the next driver chip include: in cases where the plurality of detection results include a correct result and an error result, according to display data transmitted in a data link corresponding to the correct result, storing the data to be displayed from the plurality of paths of display data, and sending the remaining data to the next driver chip, wherein the correct result represents that no error occurs in the data link, and the error result represents that an error occurs in the data link.

As at least one alternative embodiment, sending the remaining data to the next driver chip includes: using a data link corresponding to the correct result to send the remaining data to the next driver chip; and/or copying remaining data transmitted in the data link corresponding to the correct result, to obtain copied remaining data; and using a data link corresponding to the error result to send the copied remaining data to the next driver chip.

As at least one alternative embodiment, storing data to be displayed from the plurality of paths of display data includes: storing, in a ping-pong storage manner and in a target partition in a target memory, the data to be displayed, wherein the target memory is a memory corresponding to the data link corresponding to the correct result, and the display data respectively transmitted by the plurality of data links are respectively stored in the corresponding memories.

As at least one alternative embodiment, controlling the operation state of the LED lamp bead according to the data to be displayed includes: in cases where a memory read in a current reading period is not the target memory, reading the data to be displayed from the target partition in the target memory when a next reading period starts; and controlling the operation state of the LED lamp bead according to the data to be displayed that has been read.

According to another aspect of the embodiments of the present disclosure, further provided is a data processing apparatus, comprising: a detection module, configured to respectively detect plurality of paths of display data received by a current driver chip, so as to obtain a plurality of detection results, wherein the plurality of detection results respectively represent whether errors occur in the plurality of data links for transmitting the plurality of paths of display data; a storage module, configured to, according to the plurality of detection results, store data to be displayed from the plurality of paths of display data, and send the remaining data to the next driver chip, wherein the data to be displayed is data required by the current driver chip, and the remaining data is data other than the data to be displayed among the data received by the current driver chip; and a control module, configured to control the operation state of an LED lamp bead according to the data to be displayed.

According to another aspect of the embodiments of the present disclosure, further provided is a non-volatile storage medium, wherein the non-volatile storage medium includes a stored program, and when the program runs, a device where the non-volatile storage medium is located is controlled to execute any one of the foregoing data processing methods.

According to still another aspect of the embodiments of the present disclosure, further provided is a computer program product, comprising a computer program, wherein the computer program implements, when being executed by a processor, any one of the foregoing data processing methods.

In the embodiments of the present disclosure, a plurality of backup links are provided between a plurality of LED driver chips to respectively transmit the plurality of paths of backup path of data, and the plurality of LED driver chips and a controller are provided, wherein the plurality of LED driver chips respectively include a plurality of data input pins and a plurality of data output pins; wherein the plurality of data input pins of any one of LED driver chip are correspondingly connected to the plurality of data output pins of an adjacent driver chip of the any one of the LED driver chip, so that the plurality of LED driver chips are connected in series by means of a plurality of data links, and the plurality of data links are mutually independent; the controller is connected to the plurality of LED driver chips and configured to send the plurality of paths of display data to the plurality of LED driver chips, the plurality of paths of display data are backup path of data for each other, chip-level data backup is formed, and the plurality of paths of display data are respectively transmitted in the plurality of data links, so that the present disclosure achieves the purpose of chip-level data backup, and has the technical effect of allowing the use of backup path of data for processing when a chip fails, without affecting the display of the next chip, thereby solving the technical problem in the related art that the data backup of the whole video card is affected when a certain chip in the video card fails due to the fact that the video card is used as a minimum unit during data backup.

BRIEF DESCRIPTION OF THE DRAWINGS

The drawings illustrated herein are used for providing further understanding of some embodiments of the present disclosure, constitute a part of some embodiments of the present disclosure; and illustrative embodiments of the present disclosure and illustrations thereof are used for explaining some embodiments of the present disclosure, rather than constitute inappropriate limitations on the present disclosure. In the drawings.

DETAILED DESCRIPTION OF THE EMBODIMENTS

For making those skilled in the art understand the solutions of some embodiments of the present disclosure better, hereinafter, the technical solutions in the embodiments of the present disclosure will be described clearly and thoroughly with reference to the accompanying drawings of embodiments of the present disclosure. Obviously, the embodiments as described are only some of the embodiments of the present disclosure, and are not all the embodiments. All other embodiments obtained by a person of ordinary skill in the art based on the embodiments of the present disclosure without any inventive effort shall all fall within the scope of protection of the present disclosure.

It should be noted that the terms "first", "second" etc. In the description, claims, and accompanying drawings of the present disclosure are used to distinguish similar objects, and are not necessarily used to describe a specific sequence or order. It should be understood that the data so used may be interchanged where appropriate so that the embodiments of the present disclosure described herein can be implemented in sequences other than those illustrated or described herein. In addition, the terms "include" and "have", and any variations thereof are intended to cover a non-exclusive inclusion, for example, a process, method, system, product, or device that includes a series of steps or units is not necessarily limited to those steps or units that are clearly listed, but may include other steps or units that are not clearly listed or inherent to such process, method, product, or device.

According to an embodiment of the present disclosure, provided is an LED drive circuit, comprising a plurality of LED driver chips and a controller, wherein the plurality of LED driver chips respectively include a plurality of data input pins and a plurality of data output pins; wherein the plurality of data input pins of any one of LED driver chip are correspondingly connected to the plurality of data output pins of an adjacent driver chip of the any one of the LED driver chip, so that the plurality of LED driver chips are connected in series by means of a plurality of data links, and the plurality of data links are mutually independent; the controller is connected to the plurality of LED driver chips and configured to send a plurality of paths of display data to the plurality of LED driver chips, wherein the plurality of paths of display data are backup paths of data for each other, chip-level data backup is formed, and the plurality of paths of display data are respectively transmitted in the plurality of data links.

Figure 1:
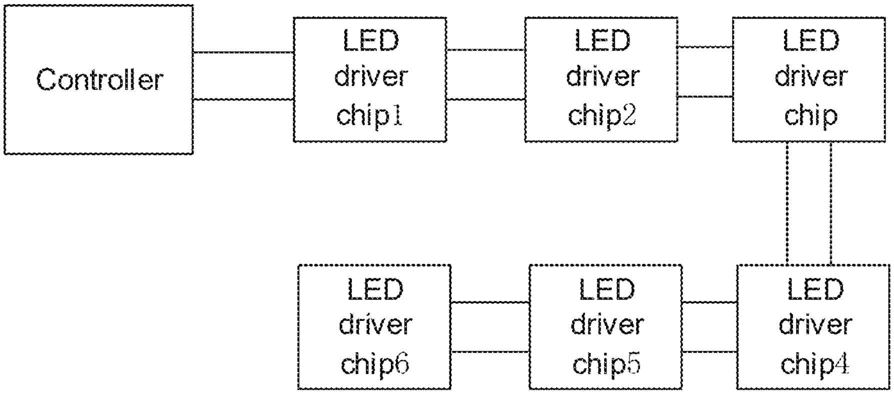
FIG. 1 is a structural schematic diagram of an LED drive circuit according to an embodiment of the present disclosure.

FIG. 1 is a structural schematic diagram of an LED drive circuit according to an embodiment of the present disclosure. As shown in FIG. 1, the LED drive circuit provided in the present disclosure is composed of a plurality of LED driver chips and a controller, the number of controllers is not limited, and the drive circuit may be controlled by only one controller or by a plurality of controllers. Each LED driver chip has a plurality of data input pins and a plurality of data output pins, and two adjacent plurality of LED driver chips are connected by means of the data input pins and output pins thereof, so that the plurality of LED driver chips form a series connection relationship.

Since each chip has a plurality of data input pins and a plurality of data output pins, a plurality of data links are formed between the plurality of LED driver chips by means of the described connection mode, and these links enable data to be transmitted between these chips. The plurality of data links are independent from each other, that is to say, data transmission of a certain link does not affect data transmission of other links.

The controller can respectively transmit the plurality of paths of display data to the plurality of LED driver chips by means of the plurality of data links, wherein one path of display data is transmitted on each data link, and the display data can be data for controlling the turning on/off of an LED, the color, the brightness, etc. The plurality of paths of display data are in a mutual backup relationship, that is to say, if a failure occurs in a certain path of data, other backup path of data can still ensure the normal operation of the LED driver chip.

As an optional embodiment, the plurality of paths of display data are two paths of display data.

As at least one alternative embodiment, during data backup, two paths of display data are generally used, with one path serving as the primary path of data and the other as the backup path of data. If an error occurs in one path of data, the other path of data can also ensure the normal operation of the LED driver chip. It should be noted that, more paths of data may also be used for backup, the better effect achieved is that the LED driver chip can still operate normally when both the primary path of data and the backup path of data fail. However, this situation is very rare. Moreover, using more paths of data for backup will consume more resources; therefore, in summary, it is a better choice to use two paths of display data for data backup.

As an optional embodiment, the transmission directions of the plurality of paths of display data are the same; a plurality of data output pins of the controller are correspondingly connected to a plurality of input pins of one target driver chip; and a plurality of data output pins of the controller respectively output the plurality of paths of display data, the target driver chip is a driver chip among the plurality of LED driver chips that has only one adjacent chip, and the controller is connected in series with the plurality of LED driver chips.

Figure 2:
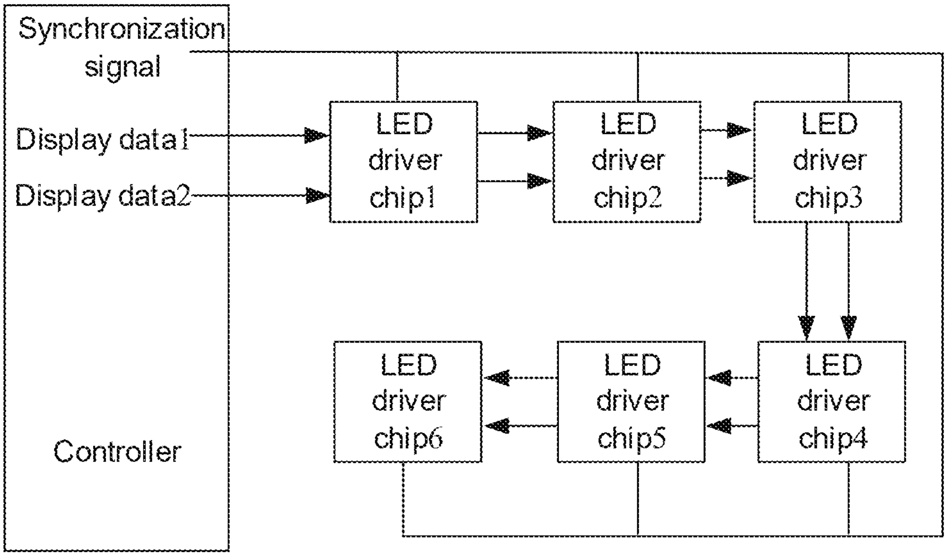
FIG. 2 is a schematic diagram of an LED drive circuit according to an optional embodiment of the present disclosure.

As at least one alternative embodiment, when the plurality of paths of display data are transmitted in the plurality of data links, there may be a plurality of transmission directions, and in different transmission manners, the controller uses different manners to be connected in series to the plurality of LED driver chips. Taking two paths of display data as an example, FIG. 2 is a schematic diagram of an LED drive circuit according to an optional embodiment of the present disclosure. As shown in FIG. 2, in the drive circuit, the transmission directions of the two paths of display data are the same, and all the display data is transmitted towards the same direction, that is, regardless of which path of display data, they are all emitted from the controller and then flow in the same direction towards the LED driver chip.

In this case, one controller may be connected to the plurality of LED driver chips, the plurality of data output pins of the controller are correspondingly connected to the plurality of input pins of the target driver chip, and each data output pin of the controller is responsible for outputting one path of display data. In this way, the plurality of data output pins can simultaneously output plurality of paths of display data, thereby realizing the control over the plurality of LED driver chips. Specifically, one controller may be connected to the target driver chip among the plurality of LED driver chips, i.e. connected to a chip located at the head of a series-connected link, wherein the chip at the head of the series-connected link is a driver chip only having one adjacent chip, and finally, a series connection relationship is also formed between the controller and the plurality of LED driver chips.

As an optional embodiment, the transmission directions of the plurality of paths of display data are opposite; there are a plurality of controllers; there are a plurality of target driver chips, a plurality of data output pins of each of the plurality of controllers are respectively correspondingly connected to a plurality of input pins of a corresponding target driver chip; and the plurality of data output pins of each of the plurality of controllers respectively output the plurality of paths of display data, the plurality of target driver chips are driver chips among the plurality of LED driver chips that have only one adjacent chip, and the plurality of controllers are connected in series with the plurality of LED driver chips.

Figure 3:
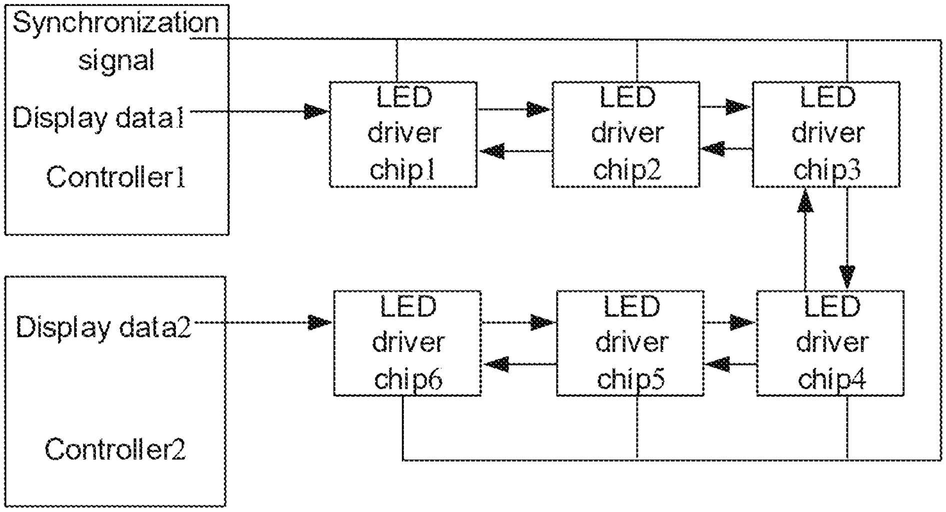
FIG. 3 is a schematic diagram of another LED drive circuit according to an optional embodiment of the present disclosure.

As at least one alternative embodiment, in the drive circuit, different display data may be transmitted in opposite directions, taking two paths of display data as an example, FIG. 3 is a schematic diagram of another LED drive circuit according to an optional embodiment of the present disclosure, as shown in FIG. 3, the transmission directions of the two paths of display data are opposite, the drive circuit has a plurality of controllers, and each controller has its own data output pins, these pins are directly connected to input pins of the corresponding target driver chip, and each controller can independently control and send data to the LED driver chip. In this case, the data output pins of each controller output one path of display data, and the plurality of controllers can simultaneously send plurality of paths of display data to the plurality of LED driver chips. In this case, the plurality of controllers are respectively connected to the corresponding target driver chips, and the target driver chips herein are driver chips, that have only one adjacent chip, among plurality of LED driver chips, i.e. chips at the head and the tail of the series-connected link; and in a case of two controllers, the one controller is connected to the driver chip at the head of the series-connected link, and the other one controller is connected to the driver chip at the tail of the series-connected link, and then the whole drive circuit presents a series-connected structure.

It should be noted that, in cases where the transmission directions of the plurality of paths of display data are the same in the above optional embodiment, if a chip has a serious problem, for example, the whole chip is burned out, the chip cannot transmit data received thereby to the next chip, as a result, all chips located on the series-connected link and behind the chip cannot operate normally, for example, if the LED driver chip 2 in FIG. 2 has a problem, none of the LED driver chip 3, the LED driver chip 4, the LED driver chip 5 and the LED driver chip 6 can operate normally. However, in cases where the transmission directions of the plurality of paths of display data are opposite in the present optional embodiment, if a certain chip has a serious problem, the chip cannot transmit data received thereby to the next chip, but the next driver chip thereof can also receive data from other chips to achieve normal operation, finally, only the chip that has a problem cannot operate normally, and other chips can work normally, for example, if the LED driver chip 2 in FIG. 3 has a problem, the LED driver chip 3 can receive backup path of data by means of the LED driver chip 4 to operate normally. The synchronization signals in FIGS. 2 and 3 are generated by the controller, and are used to ensure that the synchronization and consistency of data transmission and display are maintained between different driver chips.

As an optional embodiment, each of the plurality of LED drive chips includes a detection unit, a memory and a constant current control unit, wherein the detection unit is configured to detect the plurality of paths of display data received by a current drive chip, obtain a plurality of detection results, transmit data to be displayed among the plurality of paths of display data to the memory according to the plurality of detection results, and transmit the remaining data to the next drive chip, wherein the plurality of detection results respectively represent whether errors occur in the plurality of data links for transmitting the plurality of paths of display data, the data to be displayed is data required by the current drive chip, and the remaining data is data other than the data to be displayed among the data received by the current drive chip; the memory is configured to store the data to be displayed; and the constant current control unit is configured to read, from the memory, the data to be displayed, and control an operation state of an LED lamp bead according to the data to be displayed.

Figure 4:
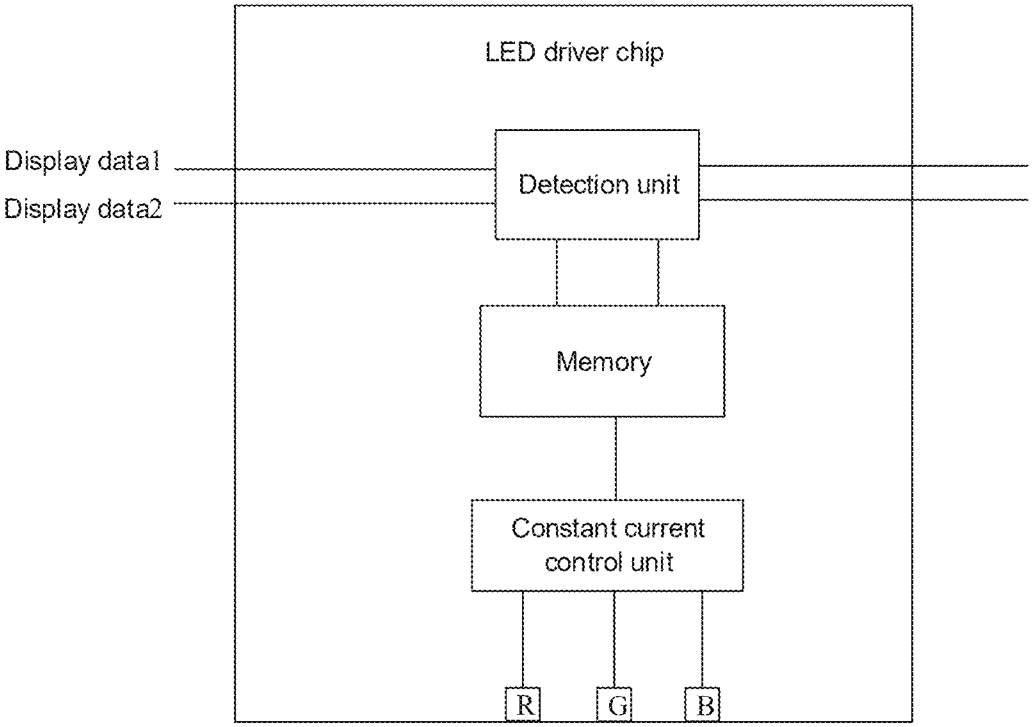
FIG. 4 is a structural schematic diagram of an LED driver chip according to an optional embodiment of the present disclosure.

As at least one alternative embodiment, FIG. 4 is a structural schematic diagram of an LED drive chip according to an optional embodiment of the present disclosure. As shown in FIG. 4, each LED driver chip among the plurality of LED driver chips includes three main units: a detection unit, a memory and a constant current control unit. The detection unit is configured to check or verify all the display data received by the current driver chip, and obtain a detection result for each path of display data, wherein the detection result reflects whether an error occurs in a transmission link transmitting the path of display data. In FIG. 4, R denotes a red lamp bead, G denotes a green lamp bead, and B denotes a blue lamp bead.

The detection unit may also identify which data is required by the current driver chip (referred to as data to be displayed), and send the data to the memory. In addition to the data to be displayed, other data received by the driver chip (referred to as remaining data) will be sent to the next driver chip. The memory is responsible for saving the data to be displayed sent by the detection unit. The constant-current control unit acquires data to be displayed from a memory, and adjusts or controls the brightness, colour or other operation states of the LED lamp bead based on the data read from the memory.

As an optional embodiment, each of the plurality of LED driver chips further includes a register, wherein the register is configured to store an error signal generated by the detection unit, and the detection unit generates an error signal when the detection result indicates that an error occurs in a data link for transmitting data.

As at least one alternative embodiment, in addition to the detection unit, the memory and the constant current control unit mentioned above, each LED driver chip further includes a register. The main responsibility of the register is to store error signals generated by the detection unit upon detection that the data link has a problem. Specifically, when the detection unit detects the received plurality of paths of display data, if it is found that one or more of the data links has a problem, the detection unit generates an error signal. Error signals may be used by other circuits or assemblies to identify and handle errors in the data link, and may also be used by personnel for fault location during troubleshooting.

According to an embodiment of the present disclosure, an embodiment of a data processing method is provided. It should be noted that the steps shown in the flowchart of the drawings can be executed in a computer system such as a set of computer executable instructions. Although the logic order is shown in the flowchart, in some cases, the shown or described steps can be executed in an order different from that described here.

Figure 5:
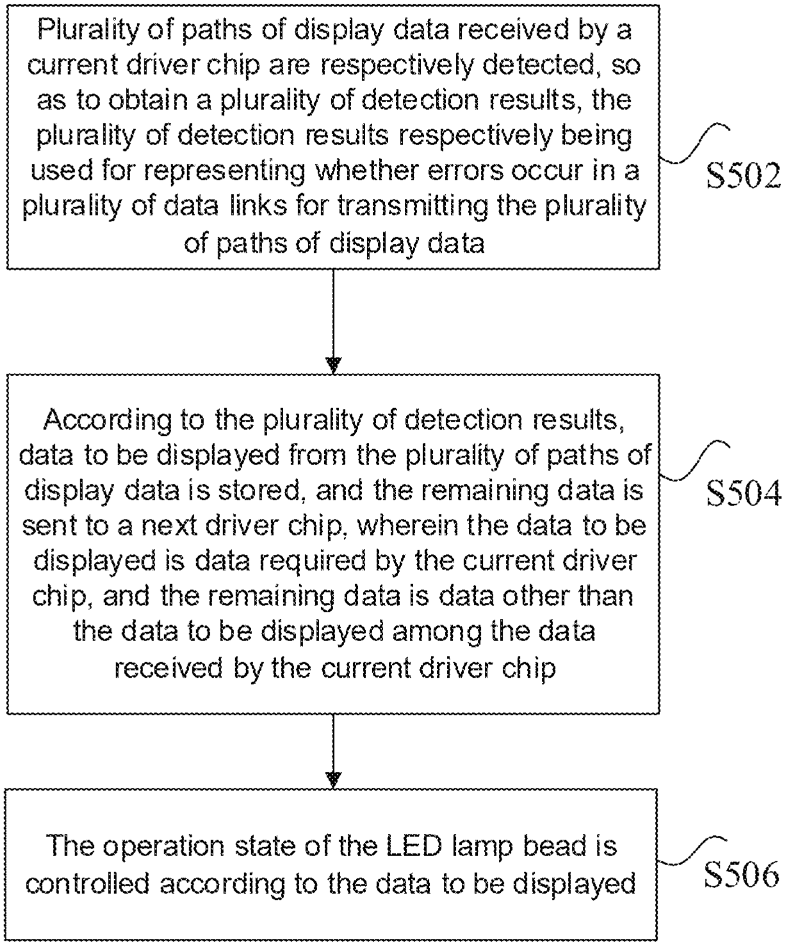
FIG. 5 is a schematic flowchart of a data processing method according to an embodiment of the present disclosure.

FIG. 5 is a schematic flowchart of a data processing method according to an embodiment of the present disclosure. As shown in FIG. 5, the method includes the following steps:

Step S502: the plurality of paths of display data received by a current driver chip are respectively detected, so as to obtain a plurality of detection results, wherein the plurality of detection results respectively represent whether errors occur in the plurality of data links for transmitting the plurality of paths of display data.

The execution body of the method may be each driver chip in the drive circuit. In this step, each path of display data received by the current driver chip can be detected, the purpose of detection is to determine whether the data is correct, and each detection result is used to represent whether an error occurs in the data link for transmitting the display data.

Step S504: according to the plurality of detection results, data to be displayed from the plurality of paths of display data is stored, and the remaining data is sent to a next driver chip, wherein the data to be displayed is data required by the current driver chip, and the remaining data is data other than the data to be displayed among the data received by the current driver chip.

In this step, after the plurality of detection results are obtained, the LED driver chip will determine which data is required by the current driver chip (i.e. data to be displayed), and which data is redundant or needs to be transmitted to the next driver chip (i.e. the remaining data). The data to be displayed will be stored in the memory in the driver chip for subsequent use. The remaining data may be transmitted to the next driver chip, so as to be continuously transmitted and processed in the drive circuit.

Step S506: an operation state of an LED lamp bead is controlled according to the data to be displayed.

In this step, once the data to be displayed is stored, the constant current control unit in the driver chip reads the data. According to the data to be displayed that has been read, the constant current control unit adjusts the brightness, color or other relevant parameters of the LED lamp bead, so as to control the operation state of the LED lamp bead. In this way, the LED driver chip can correctly display images or information according to the processed display data.

The described steps achieve the purpose of chip-level data backup, and have the technical effect of allowing the use of backup path of data for processing when a chip fails, without affecting the display of the next chip, thereby solving the technical problem in the related art that the data backup of the whole video card is affected when a certain chip in the video card fails due to the fact that the video card is used as a minimum unit during data backup.

As an optional embodiment, according to the plurality of detection results, storing data to be displayed from the plurality of paths of display data, and sending remaining data to the next driver chip include: in cases where the plurality of detection results include a correct result and an error result, according to display data transmitted in a data link corresponding to the correct result, storing the data to be displayed from the plurality of paths of display data, and sending remaining data to the next driver chip, wherein the correct result represents that no error occurs in the data link, and the error result represents that an error occurs in the data link.

As at least one alternative embodiment, when the detection unit detects the plurality of paths of display data received by the current driver chip, some results (correct results) indicating that the data link state is correct may be obtained, and some results (error results) indicating that the data link state is erroneous may also be obtained. When the plurality of paths of display data are all correct, the primary path of data can be read according to a default rule for application, and when there are correct data and error data in the plurality of paths of display data, the LED driver chip may identify data links corresponding to the correct results, and extract the transmitted display data from these data links, and then determine, among the display data transmitted in the correct data links and by means of the identifiers of the current driver chip and the identifier of the data packet, the data to be displayed required by the current driver chip, and store same in the memory. After the data to be displayed is stored, the current driver chip identifies and processes the remaining display data. The remaining data is data other than the data to be displayed, and the data is sent to the next driver chip to be continuously processed or transmitted in the system.

As an optional embodiment, sending the remaining data to the next drive chip includes: using a data link corresponding to the correct result to send the remaining data to the next drive chip; and/or copying remaining data transmitted in the data link corresponding to the correct result, to obtain copied remaining data; and using a data link corresponding to the error result to send the copied remaining data to the next driver chip.

As at least one alternative embodiment, there may be two possible implementations for sending the remaining data to the next driver chip. In one implementation, data transmission is performed only by means of the correct data link, and the erroneous link is not processed, or data transmission is performed without using the erroneous link; however, in this case, only one path of display data is available for the subsequent chips. In the second implementation, the remaining data transmitted in the correct data link is copied, and the link corresponding to the error result is used to send the copied remaining data to the next driver chip, so that subsequent chips can still receive plurality of paths of display data. It should be noted that, a data link corresponding to the error result indicates that a previously transmitted link has a problem, but cannot indicate that subsequently transmitted links also have the problem, and therefore, data transmission may still be performed by using a data link corresponding to the error result.

As an optional embodiment, storing data to be displayed from the plurality of paths of display data includes: storing, in a ping-pong storage manner and in a target partition in a target memory, the data to be displayed, wherein the target memory is a memory corresponding to the data link corresponding to the correct result, and the display data respectively transmitted by the plurality of data links are respectively stored in the corresponding memories.

Figure 6:
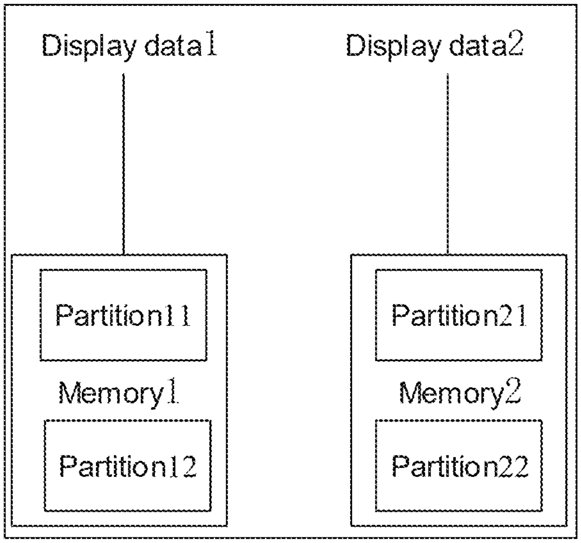
FIG. 6 is a schematic diagram of storing data according to an optional embodiment of the present disclosure.

As at least one alternative embodiment, when the data to be displayed from the plurality of paths of display data is stored, the usage of a ping-pong storage manner is an efficient and reliable method. The main principle of ping-pong storage, also known as dual-buffering, is to use two or more buffer areas to store and process data alternately, so as to implement continuous processing of data, without interrupting a data stream. FIG. 6 is a schematic diagram of storing data according to an optional embodiment of the present disclosure. As shown in FIG. 6, each path of display data has its own memory for storage, and each memory has two partitions to implement ping-pong storage, where a target memory refers to a memory corresponding to the data link corresponding to the correct result. In cases where the detection results includes correct results and error results, the driver chip may select data to be displayed transmitted by a data link corresponding to the correct result and store same in a corresponding memory.

In one storage period, data to be displayed in a certain path of display data is written into one partition of the memory, while in the next storage period, data to be displayed in the path of display data is written into another partition of the memory, and furthermore, data to be displayed written previously (written in the first storage period) may be read or processed. In this way, writing and reading/processing of data can be performed alternately, thereby achieving continuous flow and efficient processing of data. This avoids delays or interruptions due to data waiting to be processed, improving the throughput and response speed of the overall system. In the application of the LED driver chip, using a ping-pong storage mode to store data to be displayed can ensure the real-time performance and accuracy of data, and further improve the stability and performance of a system. This is critical for high-quality LED display, particularly in application scenarios requiring fast refresh and real-time display.

As an optional embodiment, controlling the operation state of the LED lamp bead according to the data to be displayed includes: in cases where the memory read in the current reading period is not the target memory, reading the data to be displayed from the target partition in the target memory when a next reading period starts; and controlling the operation state of the LED lamp bead according to the data to be displayed that has been read.

As at least one alternative embodiment, as ping-pong storage generally involves at least two storage partitions, one for the current data writing, and another for the reading and processing of data. This manner may ensure continuous flow and seamless switching of data. In this process, the system tracks the memory currently being read and the target memory (i.e., the memory including the correct data to be displayed). If data is being read from a non-target memory in the current reading period (the display data stored in the non-target memory in the previous storage period is correct), then at the beginning of the next reading period, the system switches to the target memory and reads the data to be displayed from the target partition therein. This switching ensures that the system always reads data from the memory of the correct data, thereby ensuring the accuracy and timeliness of LED display. Once the data to be displayed is read from the target partition of the target memory, the data is used to control an operation state of the LED lamp bead. This may involve adjusting the brightness, color, or other attributes of the LED lamp bead, to match the image or information represented by the data to be displayed. In this way, the LED display system can display the desired content in real time and accurately.

The example of FIG. 6 is used to illustrate the process of switching between the primary path and the backup path. In a first writing (reading) period, if the two paths of display data are correct, then a memory 1 and a memory 2 respectively write the data of display data 1 and display data 2, wherein it is assumed that the written data is in a partition 11 and a partition 21 in this case, the data is read from the partition 11 or the partition 21 in the next period, and specifically, it may be selected to read the data from the partition 11 in the memory corresponding to the display data 1; in a second writing (reading) period, the correct data stored in the previous period can be read from the partition 11, and data is also written in this period; if errors occur in the display data 1 while the display data 2 is correct among the two paths of data, then the memory 1 does not write the data in this period, and the correct data is written only in the partition 22 in the memory 2; at the beginning of a third writing (reading) period, the memory is switched for data reading, and the correct data is read from the partition 22 in the memory 2 instead of reading data from the memory 1.

It should be noted that, for ease of description, the foregoing method embodiments are stated as a combination of a series of actions. However, a person skilled in the art is to know that the present disclosure is not limited to the described action sequence, because according to the present disclosure, some steps may be performed in another sequence or simultaneously. Secondarily, a person skilled in the art knows that the embodiments described in the specification all belong to example embodiments and the involved actions and modules are not necessary for the present disclosure.

From the description of the described embodiments, a person skilled in the art would have been able to clearly understand that the data processing method in the described embodiments may be implemented by using software and necessary general hardware platforms, and of course may also be implemented using hardware, but in many cases, the former is a better embodiment. Based on such understanding, the essence of technical solution of the present disclosure, or in other words, the part of the technical solutions making contributions to the related art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Figure 7:
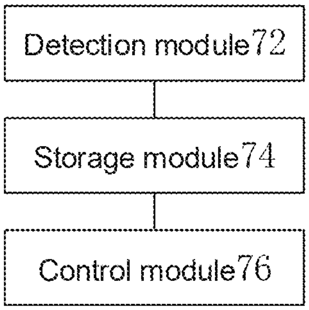
FIG. 7 is a structural block diagram of a data processing apparatus according to an optional embodiment of the present disclosure.

According to an embodiment of the present disclosure, further provided is a data processing apparatus for implementing the described data processing method. FIG. 7 is a structural block diagram of a data processing apparatus according to an embodiment of the present disclosure. As shown in FIG. 7, the data processing apparatus includes: a detection module 72, a storage module 74 and a control module 76. The data processing apparatus is described below.

The detection module 72 is configured to respectively detect plurality of paths of display data received by a current driver chip, so as to obtain a plurality of detection results, wherein the plurality of detection results respectively represent whether errors occur in the plurality of data links for transmitting the plurality of paths of display data.

The storage module 74 is connected to the detection module 72 and is configured to, according to the plurality of detection results, store data to be displayed from the plurality of paths of display data, and send remaining data to the next driver chip, wherein the data to be displayed is data required by the current driver chip, and the remaining data is data other than the data to be displayed among the data received by the current driver chip.

The control module 76 is connected to the storage module 74 and is configured to control an operation state of an LED lamp bead according to the data to be displayed.

It should be noted herein that the detection module 72, the storage module 74, and the control module 76 correspond to step S502 to step S506 in the embodiment, and examples and application scenarios implemented by the modules are the same as those implemented by the corresponding steps, but are not limited to the content disclosed in the foregoing embodiments.

Embodiments of the present disclosure may provide a computer device. As at least one alternative embodiment, in the present embodiment, the computer device may be located in at least one network device among a plurality of network devices of a computer network. The computer device includes a memory and a processor.

The memory can be configured to storing software programs and modules, such as program instructions/modules corresponding to the data processing method and apparatus in the embodiments of the present disclosure; and the processor runs the software programs and modules stored in the memory, so as to execute various function applications and data processing, i.e. to implement the described data processing method. The memory may include a high-speed random access memory, and may also include a non-transitory memory, such as one or more magnetic storage apparatuses, flash memories, or other non-transitory solid-state memories. In some instances, the memory may further include a memory remotely located from the processor, and the remote memory may be connected to the computer terminal by a network. Examples of the network above includes, but is not limited to, an Internet, intranets, a local area network, a mobile communication network, and combinations thereof.

The processor can call, by means of the transmission apparatus, information and application programs which are stored in the memory, to execute the following steps: respectively detecting the plurality of paths of display data received by a current driver chip, so as to obtain a plurality of detection results, wherein the plurality of detection results respectively represent whether errors occur in the plurality of data links for transmitting the plurality of paths of display data; according to the plurality of detection results, storing data to be displayed from the plurality of paths of display data, and sending the remaining data to the next driver chip, wherein the data to be displayed is data required by the current driver chip, and the remaining data is data other than the data to be displayed among the data received by the current driver chip; and controlling an operation state of an LED lamp bead according to the data to be displayed.

As at least one alternative embodiment, according to the plurality of detection results, storing data to be displayed from the plurality of paths of display data, and sending remaining data to the next driver chip include: in cases where the plurality of detection results include a correct result and an error result, according to display data transmitted in a data link corresponding to the correct result, storing the data to be displayed from the plurality of paths of display data, and sending the remaining data to the next driver chip, wherein the correct result represents that no error occurs in the data link, and the error result represents that an error occurs in the data link.

As at least one alternative embodiment, sending the remaining data to the next driver chip includes: using a data link corresponding to the correct result to send the remaining data to the next driver chip; and/or copying remaining data transmitted in the data link corresponding to the correct result, to obtain copied remaining data; and using a data link corresponding to the error result to send the copied remaining data to the next driver chip.

As at least one alternative embodiment, storing data to be displayed from the plurality of paths of display data includes: storing, in a ping-pong storage manner and in a target partition in a target memory, the data to be displayed, wherein the target memory is a memory corresponding to the data link corresponding to the correct result, and the display data respectively transmitted by the plurality of data links are respectively stored in the corresponding memories.

As at least one alternative embodiment, controlling an operation state of an LED lamp bead according to the data to be displayed includes: in cases where a memory read in a current reading period is not the target memory, reading the data to be displayed from the target partition in the target memory when a next reading period starts; and controlling an operation state of an LED lamp bead according to the data to be displayed that has been read.

The embodiments of the present disclosure provide a data processing solution. A plurality of backup links are provided between a plurality of LED driver chips to respectively transmit the plurality of paths of backup path of data, and the plurality of LED driver chips and a controller are provided, wherein the plurality of LED driver chips respectively include a plurality of data input pins and a plurality of data output pins; wherein the plurality of data input pins of any one of LED driver chip are correspondingly connected to the plurality of data output pins of an adjacent driver chip of the any one of the LED driver chip, so that the plurality of LED driver chips are connected in series by means of a plurality of data links, and the plurality of data links are mutually independent; the controller is connected to the plurality of LED driver chips and configured to send the plurality of paths of display data to the plurality of LED driver chips, the plurality of paths of display data are backup path of data for each other, chip-level data backup is formed, and the plurality of paths of display data are respectively transmitted in the plurality of data links, so that the present disclosure achieves the purpose of chip-level data backup, and has the technical effect of allowing the use of backup path of data for processing when a chip fails, without affecting the display of the next chip, thereby solving the technical problem in the related art that the data backup of the whole video card is affected when a certain chip in the video card fails due to the fact that the video card is used as a minimum unit during data backup.

Those skilled in the art can understand that all or some of the steps in the methods of the above embodiments may be completed by a program instructing relevant hardware of the terminal device, the program is stored in a non-volatile storage medium, and storage medium may include a flash memory disk, a read-only memory (ROM), a random access memory (RAM), a magnetic disk, an optical disk, etc.

An embodiment of the present disclosure further provides a non-volatile storage medium. As at least one alternative embodiment, in the present embodiment, the foregoing non-volatile storage medium may be used to store program codes executed by the data processing method provided in the foregoing embodiment.

As at least one alternative embodiment, in the present embodiment, the non-volatile storage medium may be located in any computer terminal in a computer terminal group in a computer network, or located in any mobile terminal in a mobile terminal group.

As at least one alternative embodiment, in the present embodiment, the non-volatile storage medium is configured to store program codes for executing the following steps: respectively detecting the plurality of paths of display data received by a current driver chip, so as to obtain a plurality of detection results, wherein the plurality of detection results respectively represent whether errors occur in the plurality of data links for transmitting the plurality of paths of display data; according to the plurality of detection results, storing data to be displayed from the plurality of paths of display data, and sending the remaining data to the next driver chip, wherein the data to be displayed is data required by the current driver chip, and the remaining data is data other than the data to be displayed among the data received by the current driver chip; and controlling an operation state of an LED lamp bead according to the data to be displayed.

As at least one alternative embodiment, according to the plurality of detection results, storing data to be displayed from the plurality of paths of display data, and sending remaining data to the next driver chip include: in cases where the plurality of detection results include a correct result and an error result, according to display data transmitted in a data link corresponding to the correct result, storing the data to be displayed from the plurality of paths of display data, and sending the remaining data to the next driver chip, wherein the correct result represents that no error occurs in the data link, and the error result represents that an error occurs in the data link.

As at least one alternative embodiment, sending the remaining data to the next driver chip includes: using a data link corresponding to the correct result to send the remaining data to the next driver chip; and/or copying remaining data transmitted in the data link corresponding to the correct result, to obtain copied remaining data; and using a data link corresponding to the error result to send the copied remaining data to the next driver chip.

As at least one alternative embodiment, storing data to be displayed from the plurality of paths of display data includes: storing, in a ping-pong storage manner and in a target partition in a target memory, the data to be displayed, wherein the target memory is a memory corresponding to the data link corresponding to the correct result, and the display data respectively transmitted by the plurality of data links are respectively stored in the corresponding memories.

As at least one alternative embodiment, controlling an operation state of an LED lamp bead according to the data to be displayed includes: in cases where a memory read in a current reading period is not the target memory, reading the data to be displayed from the target partition in the target memory when a next reading period starts; and controlling an operation state of an LED lamp bead according to the data to be displayed that has been read.

Embodiments of the present disclosure further provide a computer program product, comprising a computer program, wherein when the computer program is executed by the processor, the steps of the data processing method in the embodiments of the present application are implemented.

The sequence number of the embodiments above of the present disclosure are only for description, but do not denote the preference of the embodiments.

In the foregoing embodiments, the description of each embodiment has respective focuses. For a part that is not described in detail in an embodiment, reference may be made to the relevant description in other embodiments.

In the several embodiments provided in the present application, it should be understood that the disclosed technical content may be implemented in other manners. The apparatus embodiment described above is only schematic. For example, the division of the unit can be logical functional division, and there can be other division methods in the actual implementation, for example, plurality of units or components can be combined or integrated into another system, or some features can be ignored or not executed. In addition, the mutual coupling or direct coupling or communication connection shown or discussed may be indirect coupling or communication connection through some interfaces, units or modules, and may be in the form of electricity or other forms.

The units described as separate components may or may not be physically separated, and the components displayed as units may or may not be physical units, that is, may be located in one place, or may be distributed to a plurality of units. Some or all units can be selected according to the actual needs to achieve the purpose of the solutions of the embodiments.

In addition, the functional units in the embodiments of the present disclosure may be integrated into one processing unit, or each of the units may exist alone physically, or two or more of the units are integrated into one unit. The integrated unit may be implemented in the form of hardware, and may also be implemented in the form of a software functional unit.

If the integrated unit is implemented in the form of a software functional unit and is sold or used as an independent product, the integrated unit can be stored in a non-volatile storage medium. Based on this understanding, the essential part or the part contributing to the related art of the technical solution of the disclosure may be embodied as a form of software product. The computer software product is stored in a storage medium and includes several instructions to enable a computer device (which may be a personal computer, a server or a network device, etc.) to execute all or part of the steps of the method described in various embodiments of the disclosure. The foregoing storage medium includes: media such as a USB flash disk, a Read-Only Memory (ROM), a Random Access Memory (RAM), a removable hard disk, a magnetic disk, or an optical disk, and the like which can store program codes.

The contents above are only the preferred embodiments of the disclosure. It should be pointed out that for a person of ordinary skill in the technical field, several improvements and refinements can be made without departing from the principle of the disclosure, and these improvements and refinements shall also fall within the protection scope of the disclosure.

What is claimed is:

1. An LED drive circuit, comprising a plurality of LED driver chips and a controller, wherein the plurality of LED driver chips respectively comprise a plurality of data input pins and a plurality of data output pins; wherein the plurality of data input pins of any one of LED driver chip are correspondingly connected to the plurality of data output pins of an adjacent driver chip of the any one of the LED driver chip, so that the plurality of LED driver chips are connected in series by means of a plurality of data links, and the plurality of data links are mutually independent;

the controller is connected to the plurality of LED driver chips and configured to send a plurality of paths of display data to the plurality of LED driver chips, wherein the plurality of paths of display data are backup paths of data for each other, chip-level data backup is formed, and the plurality of paths of display data are respectively transmitted in the plurality of data links;

wherein the transmission directions of the plurality of paths of display data are opposite; there are a plurality of controllers; there are a plurality of target driver chips, a plurality of data output pins of each of the plurality of controllers are respectively correspondingly connected to a plurality of input pins of a corresponding target driver chip; and the plurality of data output pins of each of the plurality of controllers respectively output the plurality of paths of display data, the plurality of target driver chips are driver chips among the plurality of LED driver chips that have only one adjacent chip, and the plurality of controllers are connected in series with the plurality of LED driver chips.

2. The drive circuit as claimed in claim 1, wherein transmission directions of the plurality of paths of display data are the same; a plurality of data output pins of the controller are correspondingly connected to a plurality of input pins of one target driver chip; and a plurality of data output pins of the controller respectively output the plurality of paths of display data, the target driver chip is a driver chip among the plurality of LED driver chips that has only one adjacent chip, and the controller is connected in series with the plurality of LED driver chips.

3. The drive circuit as claimed in claim 1, wherein the plurality of paths of display data are two paths of display data.

4. The drive circuit as claimed in claim 1, wherein each of the plurality of LED driver chips comprises a detection unit, a memory and a constant current control unit, wherein the detection unit is configured to detect the plurality of paths of display data received by a current driver chip, obtain a plurality of detection results, transmit data to be displayed among the plurality of paths of display data to the memory according to the plurality of detection results, and transmit remaining data to the next driver chip, wherein the plurality of detection results respectively represent whether errors occur in the plurality of data links for transmitting the plurality of paths of display data, the data to be displayed is data required by the current driver chip, and the remaining data is data other than the data to be displayed among the data received by the current driver chip;

the memory is configured to store the data to be displayed; and the constant current control unit is configured to read, from the memory, the data to be displayed, and control an operation state of an LED lamp bead according to the data to be displayed.

5. The drive circuit as claimed in claim 4, wherein each of the plurality of LED driver chips further comprises a register, wherein the register is configured to store an error signal generated by the detection unit, and the detection unit generates an error signal when the detection result indicates that an error occurs in a data link for transmitting data.

6. A method for data processing, applied to the LED drive circuit as claimed in claim 1, wherein the data processing method comprising:

respectively detecting the plurality of paths of display data received by a current driver chip, so as to obtain a plurality of detection results, wherein the plurality of detection results respectively represent whether errors occur in the plurality of data links for transmitting the plurality of paths of display data;

according to the plurality of detection results, storing data to be displayed from the plurality of paths of display data, and sending remaining data to the next driver chip, wherein the data to be displayed is data required by the current driver chip, and the remaining data is data other than the data to be displayed among the data received by the current driver chip; and controlling an operation state of an LED lamp bead according to the data to be displayed.

7. The method as claimed in claim 6, wherein according to the plurality of detection results, storing data to be displayed from the plurality of paths of display data, and sending remaining data to the next driver chip comprising:

in cases where the plurality of detection results comprise a correct result and an error result, according to display data transmitted in a data link corresponding to the correct result, storing the data to be displayed from the plurality of paths of display data, and sending remaining data to the next driver chip, wherein the correct result represents that no error occurs in the data link, and the error result represents that an error occurs in the data link.

8. The method as claimed in claim 7, wherein sending the remaining data to the next driver chip comprising:

using a data link corresponding to the correct result to send the remaining data to the next driver chip;

and/or copying remaining data transmitted in the data link corresponding to the correct result, to obtain copied remaining data; and using a data link corresponding to the error result to send the copied remaining data to the next driver chip.

9. The method as claimed in claim 7, wherein storing data to be displayed from the plurality of paths of display data comprising:

storing, in a ping-pong storage manner and in a target partition in a target memory, the data to be displayed, wherein the target memory is a memory corresponding to the data link corresponding to the correct result, and display data respectively transmitted by the plurality of data links are respectively stored in the corresponding memories.

10. The method as claimed in claim 9, wherein controlling an operation state of an LED lamp bead according to the data to be displayed comprising:

in cases where a memory read in a current reading period is not the target memory, reading the data to be displayed from the target partition in the target memory when a next reading period starts; and controlling an operation state of an LED lamp bead according to the data to be displayed that has been read.

11. A non-volatile storage medium, wherein the non-volatile storage medium comprises a stored program, and when the program runs, a device where the non-volatile storage medium is located is controlled to execute the method as claimed in claim 7, so that the device can execute following actions:

respectively detecting the plurality of paths of display data received by a current driver chip, so as to obtain a plurality of detection results, wherein the plurality of detection results respectively represent whether errors occur in the plurality of data links for transmitting the plurality of paths of display data;

according to the plurality of detection results, storing data to be displayed from the plurality of paths of display data, and sending remaining data to the next driver chip, wherein the data to be displayed is data required by the current driver chip, and the remaining data is data other than the data to be displayed among the data received by the current driver chip; and controlling an operation state of an LED lamp bead according to the data to be displayed.

* * * * *